(12) United States Patent
Savla

(10) Patent No.: US 9,759,345 B2
(45) Date of Patent: Sep. 12, 2017

(54) SYSTEMS, METHODS, AND APPARATUS FOR LEAK DETECTION AND PREVENTION

(76) Inventor: Lalit Savla, San Diego, CA (US)

( * ) Notice: Subject to any disclaimer, the term of this patent is extended or adjusted under 35 U.S.C. 154(b) by 1788 days.

(21) Appl. No.: 11/956,564

(22) Filed: Dec. 14, 2007

(65) Prior Publication Data

US 2008/0143540 A1    Jun. 19, 2008

Related U.S. Application Data

(60) Provisional application No. 61/875,662, filed on Dec. 19, 2006.

(51) Int. Cl.
| | | |
|---|---|---|
| *F16K 31/05* | (2006.01) | |
| *F16K 31/02* | (2006.01) | |
| *F16K 35/06* | (2006.01) | |
| *G01M 3/16* | (2006.01) | |
| *G01M 3/18* | (2006.01) | |

(52) U.S. Cl.
CPC ............ *F16K 31/055* (2013.01); *F16K 31/02* (2013.01); *F16K 31/05* (2013.01); *F16K 35/06* (2013.01); *G01M 3/16* (2013.01); *G01M 3/18* (2013.01); *Y10T 137/1842* (2015.04); *Y10T 137/5762* (2015.04); *Y10T 137/7256* (2015.04)

(58) Field of Classification Search
CPC ........ F16K 31/055; F16K 31/05; F16K 31/02; F16K 35/06; Y10T 137/5762; Y10T 137/7256; Y10T 137/1842
USPC ....... 137/312, 78.1, 385; 251/228, 231, 232, 251/248, 251, 252, 89, 92, 93, 114; 340/605; 73/40.7
See application file for complete search history.

(56) References Cited

U.S. PATENT DOCUMENTS

| | | | | |
|---|---|---|---|---|
| 3,358,294 | A | * | 12/1967 | Nolan et al. ...................... 4/661 |
| 3,889,924 | A | * | 6/1975 | Karpenko .................. 251/249.5 |
| 3,989,223 | A | * | 11/1976 | Burkhardt et al. ............. 251/58 |
| 4,324,268 | A | | 4/1982 | Jacobson |
| 4,455,012 | A | * | 6/1984 | Gupta ...................... 251/129.05 |
| 4,488,567 | A | | 12/1984 | Grant |
| 4,940,292 | A | * | 7/1990 | Bezos et al. .................... 303/81 |
| 4,984,449 | A | | 1/1991 | Caldwell et al. |
| 5,131,623 | A | * | 7/1992 | Giordani .................. 251/129.03 |
| 5,240,022 | A | | 8/1993 | Franklin |
| 5,251,653 | A | | 10/1993 | Tucker |
| 5,334,973 | A | * | 8/1994 | Furr .............................. 340/605 |

(Continued)

OTHER PUBLICATIONS

International Search Report/Written Opinion issued in PCT/US2007/087731 on May 20, 2008.

*Primary Examiner* — Atif Chaudry
(74) *Attorney, Agent, or Firm* — Richard Campbell; William C. Boling

(57) ABSTRACT

A leak detection and prevention system includes a gear motor linkage assembly. The gear motor linkage assembly includes a gear motor and a gear motor controller/driver module that controls operation of the gear motor. The gear motor linkage assembly also includes a push lever attached to a shaft of the gear motor, the push lever in a home position, wherein when a signal indicating that a leak has been detected is received the gear motor controller/driver module controls the gear motor to rotate the push lever so that the push level non-captively engages a handle of a valve and pushes the handle to a closed position, then the gear motor controller/driver module controls the gear motor to rotate the push lever to the home position.

17 Claims, 11 Drawing Sheets

(56) References Cited

U.S. PATENT DOCUMENTS

| | | |
|---|---|---|
| 5,409,037 A | 4/1995 | Wheeler et al. |
| 5,539,383 A * | 7/1996 | Chin .......................... 340/604 |
| 5,546,009 A | 8/1996 | Raphael |
| 5,588,637 A * | 12/1996 | Carsten et al. .......... 251/129.03 |
| 5,655,561 A | 8/1997 | Wendel |
| 5,681,025 A * | 10/1997 | Kuhn et al. .............. 251/129.12 |
| 5,967,171 A | 10/1999 | Dwyer, Jr. |
| 6,073,907 A * | 6/2000 | Schreiner et al. ....... 251/129.12 |
| 6,186,162 B1 | 2/2001 | Purvis et al. |
| 6,206,337 B1 | 3/2001 | Veillet, Jr. |
| 6,362,741 B1 | 3/2002 | Hickoox et al. |
| 6,489,895 B1 | 12/2002 | Apelman |
| 6,491,062 B1 | 12/2002 | Croft |
| 6,523,562 B2 | 2/2003 | Harper |
| 6,530,557 B1 * | 3/2003 | Guzorek .................. 251/129.12 |
| 6,597,290 B2 * | 7/2003 | Mogi ........................ 340/686.1 |
| 6,662,821 B2 | 12/2003 | Jacobsen et al. |
| 6,675,826 B1 | 1/2004 | Newman |
| 6,696,961 B2 | 2/2004 | Uhler |
| 7,044,154 B2 | 5/2006 | Henderson |
| 7,066,192 B1 | 6/2006 | Delaney et al. |
| 7,424,896 B1 * | 9/2008 | Martin et al. ................. 137/312 |
| 8,256,742 B2 * | 9/2012 | Staffiere et al. ......... 251/129.11 |
| 2004/0242091 A1 * | 12/2004 | Okuyama et al. .............. 440/86 |

\* cited by examiner

SYSTEMS, METHODS, AND APPARATUS FOR LEAK DETECTION AND PREVENTION

RELATED APPLICATIONS

This application claims the benefit of U.S. Provisional Patent Application Ser. No. 60/875,662, filed Dec. 19, 2006, entitled "House Flood Prevention Device" which is hereby incorporated herein by reference in its entirety.

BACKGROUND

1. Field

This invention relates generally to a house flood prevention device, and, more particularly, to control of a water valve to prevent flooding.

2. Background

A water leak in a home or business can cause extensive damage. The damage can be even greater if the leak is not detected for an extended period of time. For example, if a homeowner or business owner is away from their home or business for an extended period of time and there is a leak, the leak may not be detected until the owner returns. This can result in a great amount of water damage before the leak is detected.

Generally, a main water supply line to a building includes a valve that can be operated to shut off the water supply. Once a leak is detected, the owner can locate the valve and close it to stop the leak. The source of the leak can then be repaired and the water supply turned back on.

There have been some automatic leak detection systems developed. In general, these leak detection systems install leak sensors in locations in a building where a leak may occur. When a sensor detects a leak, a specialized valve in the water supply line activates to shut off the water supply. In these types of systems, the home or business owner must buy the specialized valve, and hire a plumbing specialist to install the valve. Other types of leak detection systems modify existing water supply valves to adapt them for automatic operation. Again, the installation of the system requires plumbing modifications and professional installation, leading to increased expenses and complications.

There is therefore a need for an improved leak detection and prevention system.

SUMMARY

Systems methods and apparatus for a leak detection and prevention system are described. In one embodiment a leak detection and prevention system includes a gear motor linkage assembly. The gear motor linkage assembly includes a gear motor and a gear motor controller/driver module that controls operation of the gear motor. The gear motor linkage assembly also includes a push lever attached to a shaft of the gear motor, the push lever in a home position, wherein when a signal indicating that a leak has been detected is received by the gear motor controller/driver module the gear motor controller/driver module controls the gear motor to rotate the push lever so that the push lever non-captively engages a handle of a valve and pushes the handle to a closed position, then the gear motor controller/driver module controls the gear motor to rotate the push lever to the home position. The leak detection and prevention system also includes at least one leak detection sensor that includes a detection circuit that measures the resistance between the at least two detection probes and when the resistance between the at least two detection probes is below a predetermined value a switch activates a transmitter that transmits the signal indicating the presence of a leak.

In one embodiment, the leak detection signal is either wireless transmitted or hard wired. The valve can be a ball valve, or a gate valve. In addition, the valve can be manually operated when the push lever is in the home position. Detecting the handle of the valve is in a closed position comprises detecting an increase in current to the gear motor and detecting the push lever is in the home position comprises detecting an increase in current to the gear motor.

In another embodiment, a gear motor controller/driver module includes a motor drive logic module that receives a signal indicating the presence of a leak. In response to receiving the signal indicating the presence of a leak the motor drive logic module generates commands to drive a gear motor and rotate a push lever attached to a shaft of the gear motor. A motor driver module receives the commands and applies power to the gear motor causing the shaft of the gear motor to rotate in a first direction. A current limiter module monitors a level of current supplied to the motor, the current limiter module detects a first current spike indicating that the push lever attached to the gear motor shaft has reached a first stop whereupon the motor drive logic module generates a command causing the shaft of the gear motor to rotate in a second direction, opposite the first direction, until the current limiter module detects a second current spike indicating that the push lever attached to the gear motor shaft has reached a second stop in a home position whereupon the motor drive logic module generates a command to stop the gear motor.

In one embodiment, the gear motor controller/driver is attached to a ball valve. Typically, there is high motor start-up current due to high start-up torque of the ball valve in the first direction when the command is generated to apply power to the gear motor. A low pass filter circuit can block, or prevent, this current from being detected. The filter can also block current spikes generated due to DC brush motor noise, gear train generated torque spikes, and other types of current spikes.

In another embodiment, the signal indicating the presence of a leak is received from a leak detection sensor. Also, the current limiter module can increase a current threshold during motor start. The push lever attached to the shaft of the gear motor non-captively engages a valve handle. In addition, the first stop corresponds to a closed position of the valve handle. The push lever can non-captively engage a handle of a ball valve or a gate valve.

In yet another embodiment, a leak detection sensor includes at least two detection probes. The sensor also includes a detection circuit that measures the resistance between the at least two detection probes and when the resistance between the at least two detection probes is below a predetermined value a switch activates a transmitter that transmits a signal indicating the presence of a leak, the signal is transmitted for a predetermined period of time and then the transmitter is powered off extending life of a battery in the sensor. Optionally, the leak detection circuit can also be a part of the gear motor controller/driver module making it a stand-alone unit for local leak detection and prevention.

In one embodiment the leak detection sensor can be installed in a decorative statue. Also, the leak detection sensor can include a transmitter module, such as a wireless or wired transmitter.

In still another embodiment, a method of controlling a gear motor includes generating a command to apply power to the gear motor to cause a shaft of the gear motor to rotate in a first direction. The method includes monitoring a level of current supplied to the motor, and when the current level exceeds a first threshold level indicating that a push lever attached to the gear motor shaft has reached a first stop, generating a command causing the shaft of the gear motor to rotate in a second direction, opposite the first direction. It may include further monitoring a level of current supplied to the motor, and, when the current level exceeds a second threshold level indicating that the push lever attached to the gear motor shaft has reached a second stop, generating a command to stop the gear motor.

In one embodiment, a threshold level for the gear motor current monitoring is the same value for both directions of rotation of the gear motor. The motor drive logic module determines the direction of rotation by commanding a first direction of rotation, for example clockwise. On the detection of a first current spike, or pulse, the motor is commanded to reverse the direction to counterclockwise. On detection of a second current spike, or pulse, the motor is commanded to stop.

In another embodiment, a method of detecting and preventing a leak includes detecting that a leak has occurred and transmitting a signal indicating that the leak has been detected. The method includes non-captively engaging a handle of a supply valve with a push lever and driving the handle to a closed position, and may include disengaging the handle and returning the push lever to a home position while the handle remains in the closed position.

Other features and advantages of the present invention should be apparent after reviewing the following detailed description and accompanying drawings which illustrate, by way of example, aspects of the invention.

BRIEF DESCRIPTION OF THE DRAWINGS

These and other aspects, advantages and details of the present invention, both as to its structure and operation, may be gleaned in part by a study of the accompanying exemplary drawings, in which like reference numerals refer to like parts. The drawings are not necessarily to scale, emphasis instead being placed upon illustrating the principles of the invention.

DETAILED DESCRIPTION

Certain embodiments as disclosed herein provide for methods, systems, and apparatus for leak detection and prevention. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
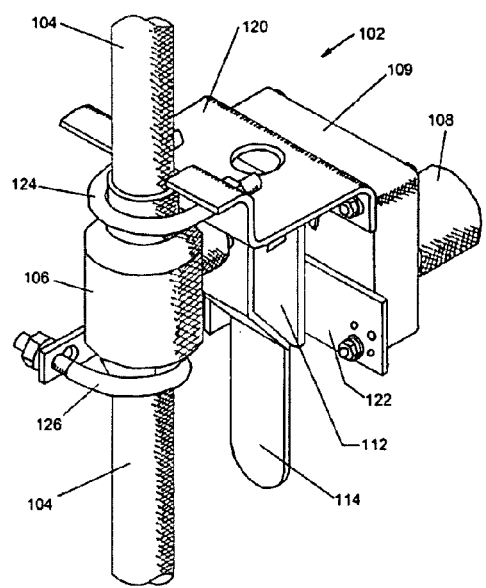
FIG. 1 is a perspective view of one embodiment of a gear motor linkage assembly.
Figure 2:
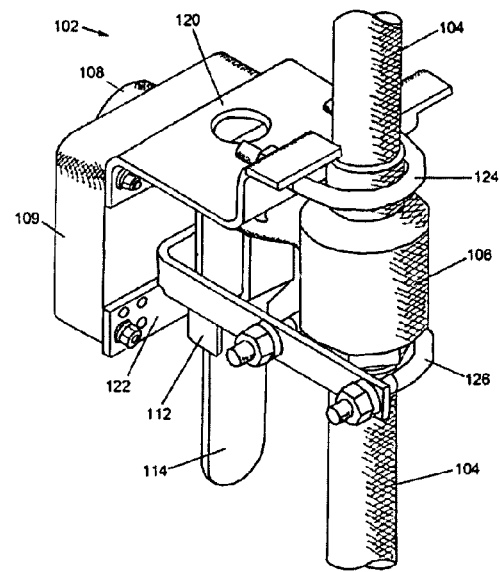
FIG. 2 is a perspective view of the gear motor linkage assembly of FIG. 1 from a different angle.
Figure 3:
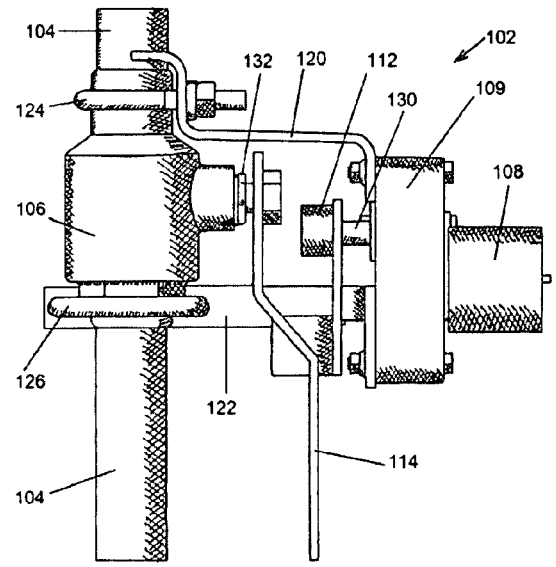
FIG. 3 is side view of the gear motor linkage assembly of FIG. 1.

FIG. 1 is a perspective view of one embodiment of a gear motor linkage assembly. FIG. 2 is a perspective view of the gear motor linkage assembly of FIG. 1 from a different angle. FIG. 3 is side view of the gear motor linkage assembly of FIG. 1. As shown in FIGS. 1-3, the gear motor linkage assembly 102 is attached to an existing supply line 104, such as a water supply line. The supply line includes a main ball valve 106 that operates to allow or stop flow through the supply line 104. In the embodiment illustrated in FIGS. 1-3, the gear motor linkage assembly 102 attaches to, or fits on, the existing supply line 104 and main ball valve 106 without requiring any plumbing changes or modifications of the valve. As described further below, during operation if a leak detection sensor (not shown) detects a leak then the gear motor assembly 102 receives a signal from the leak sensor and operates to close the main ball valve 106 interrupting flow through the supply line 104. The gear motor linkage assembly 102 can also be attached to a stand alone ball valve. In this way, any mechanical ball valve can be converted to an electronically controlled ball valve.

The gear motor linkage assembly 102 includes a motor 108, a gear box assembly 109, a wireless receiver module, water sensor circuit and motor controller/driver electronics 110 (mounted on the gear box assembly and not shown in the diagram for clarity) and a push lever 112. During operation, the gear motor controller/driver monitors and receives signals from at least one leak detection sensor when the sensor detects that a leak has occurred. Upon receiving a leak detection signal the gear motor controller/driver 110 controls the gear motor 108 to turn on and to rotate the push lever 112. When the push lever 112 rotates, it non-captively engages a ball valve handle 114 and pushes the ball valve handle 114 to a closed position thereby interrupting flow through the supply line 104. After the push lever 112 engages the ball valve handle 114 and pushes it to its closed position, the push lever 112 returns to a home position that is out of the way of the ball valve handle 114 so that it can be operated manually in its normal fashion. The non-captive engagement of the ball valve handle 114 allows the valve handle to be manually operated without interference from the push lever 112 when the push lever 112 is not engaging the ball valve handle 114. In other words, before the push lever 112 engages the ball valve handle 114, the ball valve handle 114 can be operated manually in its normal fashion.

In the embodiment shown in FIG. 3, the gear motor shaft 130 need not be in line with the ball valve shaft 132. An offset between the two shafts 130 and 132 can be used to gain extra torque from the gear motor 108. For example, the gain in the torque will be proportional to the distance between the axis of the two shafts 130 and 132. In another embodiment, the two axis of the two shafts 130 and 132 are in line with each other.

After the ball valve handle 114 is pushed to its closed position the gear motor controller/driver 110 (not shown) controls the gear motor 108 to rotate the push lever 112 in the opposite direction back to its starting, or home position. As the push lever 112 rotates back to its home position, the ball valve handle 114 will remain in the closed position preventing flow through the supply line 104.

In the embodiment illustrated in FIGS. 1-3, the gear motor linkage assembly 102 is attached the body of the ball valve 106 by a top bracket 120, a lower bracket 122, and two U-bolts 124 and 126. The U-bolts 124 and 126 maintain the position of the gear motor linkage assembly 102 relative to the supply line 104 and main ball valve 106. The top and lower brackets 120 and 122 operate to prevent the gear motor linkage assembly 102 from rotating during operation. Further details of the upper and lower brackets 120 and 122 are provided below. An advantage of attaching the gear motor linkage assembly 102 to the rigid body of the ball valve 106 is that the rigid body of the ball valve 106 can typically withstand stresses caused by operation of the gear motor linkage assembly 102. Optionally, the gear motor assembly 102 can be attached to the supply line 104.

As noted, following operation of the gear motor linkage assembly 102 the main ball valve handle 114 stays in the closed position. With the push lever 112 has returned to its home position, a user may manually turn the ball valve handle 114 to its open position. Because the main ball valve handle 114 is manually operated to its open position, and not under control of the gear motor linkage assembly 102, there is not a possibility of the main ball valve 106 opening inadvertently, such as prior to a leak being fixed, due to electronics malfunction or accidental remote open command.

After a leak has been fixed and the main ball valve handle 114 manually turned to the open position, the gear motor linkage assembly 102 is automatically armed for future leaks without any further actions from the user. Another aspect is that during operation the ball valve handle 114 can be manually operated to open and close the main ball valve 106 at any time without any interference from the gear motor assembly 102. In this way, the gear motor linkage assembly 102 only intervenes with manual operation of the main ball valve 106 when a leak is detected by any of one or more leak detection sensors and the gear motor linkage assembly 102 operates to shut off, or close, the main ball valve 106. Therefore, the gear motor linkage assembly 102 is transparent to a user after it is installed while it continuously monitors and protects property from leaks.

The ability to operate the main ball valve 106 in its normal manual operation is advantageous over other automatic valve controllers which require use of the automatic control for valve operation and are therefore subject to failure of the controller, making the valve inoperable. For example, in other automatic valve controllers, if there was a failure in the controller a user may not be able to manually operate the valve, or it may be difficult to operate the valve. Thus, if there was a failure in the automatic valve controller, and a leak occurs, it may be difficult for a user to turn off the valve, or to turn the valve back on after the leak has been repaired. In contrast to other automatic valve controllers, once the gear motor linkage assembly 102 is installed it is transparent to a user such that the user can open or close the ball valve 106 manually without any interference from the installed device. Thus, even if there were a failure in the gear motor linkage assembly 102, if there is a leak, or the user wants to turn off the power supply for any other reason, the user can turn the valve on and off manually in its normal operation.

Figure 4A:
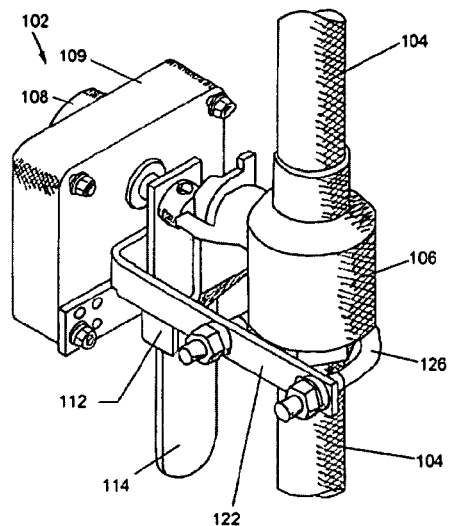
FIG. 4A is a perspective view of the gear motor linkage assembly of FIG. 1 in its home position and with the top bracket removed for clarity.
Figure 4B:
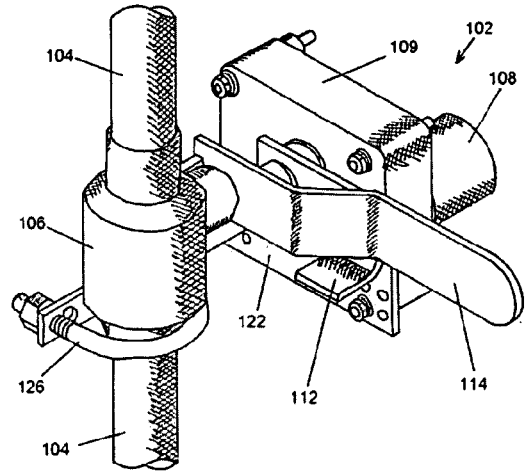
FIG. 4B is a perspective view of the gear motor linkage assembly of FIG. 1 in its actuated position and with the top bracket removed for clarity.
Figure 4C:
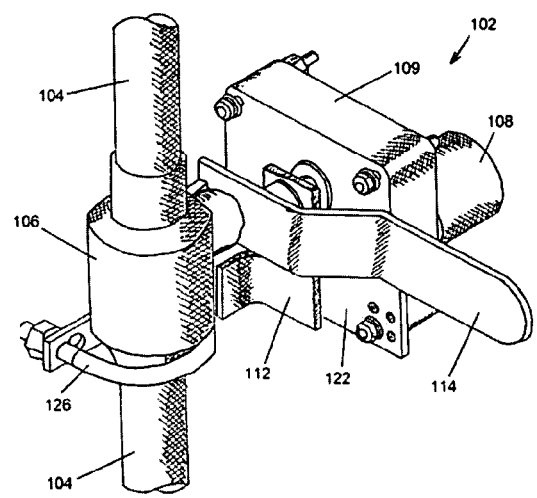
FIG. 4C is perspective view of the gear motor linkage assembly of FIG. 1 returned to its home position after turning off the main ball valve and with the top bracket removed for clarity.

FIG. 4A is a perspective view of the gear motor linkage assembly of FIG. 1 in its home position and with the top bracket removed for clarity. FIG. 4B is a perspective view of the gear motor linkage assembly of FIG. 1 in its actuated position and with the top bracket removed for clarity. FIG. 4C is a perspective view of the gear motor linkage assembly of FIG. 1 returned to its home position after turning off the main ball valve and with the top bracket removed for clarity.

As shown in FIG. 4A, the push lever 112 is in its home position. The ball valve handle 114 is in its open position thereby opening the main ball valve 106 and allowing flow through the supply line 104. In FIG. 4B, the gear motor controller/driver 110 (not shown) has received a signal from a leak detection sensor (not shown) indicating the presence of a leak. In response, the gear motor controller/driver 110 controls the motor 108 and gear box assembly 109 so that it rotates the push lever 112. As the push lever 112 rotates it non-captively engages the ball valve handle 114 and pushes the ball valve handle 114 to its closed position. As discussed further below, the gear motor controller/driver 110 detects when the ball valve handle 114 is in its closed position and commands the gear motor 108 and gear box assembly 109 to rotate the push lever 112 in the opposite direction until the push lever 112 has returned to its home position.

When reaching the home position the push lever 112 will engage the lower bracket 122. The gear motor controller/driver detects when the push lever 112 has engage the lower bracket 122 and commands the gear motor 108 to stop rotating the push lever 112. FIG. 4C illustrates the gear motor linkage assembly 102 after operating and the push lever 112 in its home position. As shown in FIG. 4C, the push lever 112 is returned to its home position and the ball valve handle 114 remains in the closed position.

Figure 5:
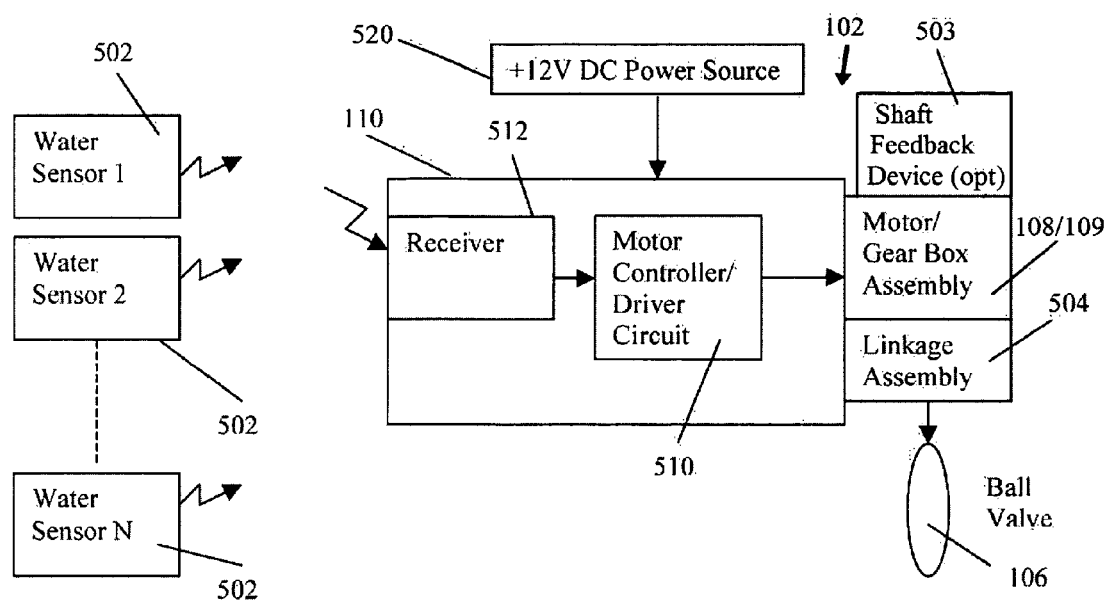
FIG. 5 is a block diagram of an embodiment of a leak detection and prevention system.

FIG. 5 is a block diagram of an embodiment of a leak detection and prevention system. As shown in FIG. 5, the system includes a gear motor linkage assembly 102 and at least one leak detection sensor 502. In the embodiment illustrated in FIG. 5, there are a plurality of leak detection sensors 502.

As shown in FIG. 5, the gear motor linkage assembly 102 includes a motor 108 and gear box assembly 109 (referenced together as gear motor), a gear motor controller/driver 110, and a linkage assembly 504 that includes the push lever 112, and upper and lower brackets 120 and 122. A shaft feedback device 503 may optionally be coupled to the shaft of motor 108. In the embodiment illustrated in FIG. 5, the gear motor controller/driver 110 includes a motor controller/driver circuit 510 and a receiver 512.

The receiver 512 receives signals from the leak detection sensors 502. In one embodiment, the signals transmitted from the leak detection sensors 502 are transmitted by a wireless transmitter in the leak detection sensor 502. In another embodiment, the signals are transmitted from the leak detection sensors 502 over a wire. In another embodiment, the signal transmitted from the leak detection sensor can be a combination of wired and wireless connections. In yet another embodiment, the receiver may also include leak detection circuit to detect the leak locally in the vicinity of the gear motor linkage assembly.

In one embodiment, transmitters in the leak detection sensors 502 and the receiver 512 in the gear motor controller/driver 110 operate on the same frequency and code for a given installation. The code can be changed to prevent disturbance from other devices with the same facility or from a similar system installed in a nearby or neighboring facility. When any one of the leak detection sensors 502 sensors detects a leak, it transmits a signal to the receiver 512 in the gear motor control/driver 110. If the distance between the leak detection sensors 502 and the receiver 512 is too great, or there is excessive electrical noise or interference, repeaters can be used to increase the range of the transmitted signal.

In the embodiment illustrated in FIG. 5, the gear motor linkage assembly 102 is powered by an external power source 520. The external power source can be a DC source, or a power supply that converts AC power to DC power. In another embodiment, the gear motor linkage assembly 102 includes an internal power source. In still another embodiment, the gear motor linkage assembly 102 can include an internal, or external, backup power source to be used if an external power source fails.

In one embodiment of the leak detection and prevention system of FIG. 5, the leak detection sensors 502 can be placed at various locations in a facility, such as a house or business, that may be prone to a water leak. When one of the leak detection sensors 502 detects a leak it sends a signal that is received by the gear motor linkage assembly 102 which activates the assembly to close the ball valve 106

Figure 6:
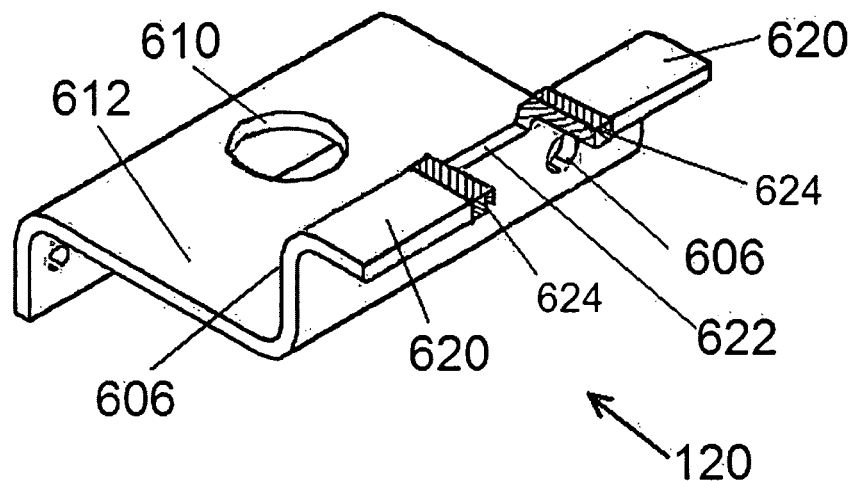
FIG. 6 is a perspective view providing further detail of an embodiment of a top bracket as illustrated in FIGS. 1-3.

FIG. 6 is a perspective view providing further detail of an embodiment of a top bracket 120 as illustrated in FIGS. 1-3. The top bracket 120 can help anchor the gear motor 108/109 and the gear motor controller/driver 110 to the topside of the ball valve 106. As shown in FIGS. 1-3, the top bracket 120 is secured to the ball valve 106 with a U-bolt 124 that wraps around the ball valve 106, or supply line 104, and extends through two holes 606 in the top bracket 120. A hole 610 in the upper surface 612 of the top bracket 120 allows access to a set-screw or cotter pin, if present, on the push lever 112.

In one embodiment, the top bracket 120 includes ears 620 that form a center opening 622. The center opening 622 can be lined with pipe guards 624 that provide a compliant surface to interface with the ball valve 106, or supply line 104. The ears 620 and pipe guards 624 can define a mounting position and help prevent the gear motor linkage assembly 102 from rotating around the ball value under heavy load such as when the gear motor linkage assembly 102 is operating. In one embodiment, the pipe guards can be slip-on plastic guards that can function as gap fillers for various pipe sizes.

In anther embodiment, the top bracket 120 does not include the ears 620. In this embodiment, the top and lower bracket 120 and 122 provide adequate support to prevent movement of the gear motor linkage assembly 102 during operation.

Figure 7:
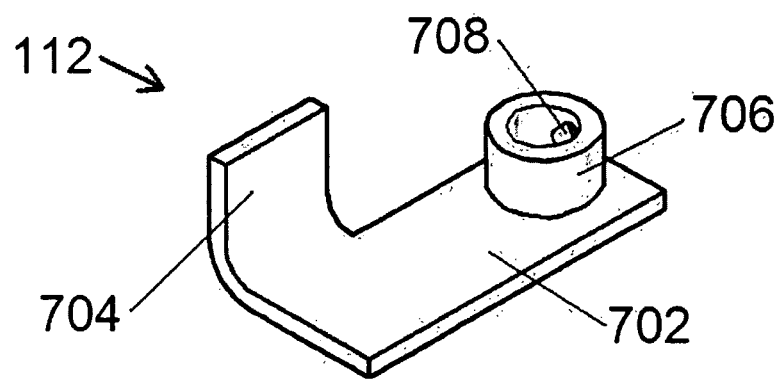
FIG. 7 is a perspective view of an embodiment of the push lever as illustrated in FIGS. 1-3.

FIG. 7 is a perspective view of an embodiment of the push lever 112 as illustrated in FIGS. 1-3. In the embodiment illustrated in FIG. 7, the push lever 112 includes a flat surface 702. At one end of the flat surface 112 there is a lip 704 projecting up from the side of the flat surface 702 approximately perpendicular to the flat surface 702. In one embodiment, the lip is "rolled" of other wise formed as an integral part of the flat surface 704. In another embodiment, the lip 704 is a separate piece that is attached to the flat surface 702. In another embodiment, the lip 704 can be formed as a round roller for reduced friction when it pushes the ball valve handle 114.

At the end of the flat surface 112 opposite the lip 704 is a receiver 706. The receiver can be sized to fit over the gear motor shaft 130. In one embodiment, as shown in FIG. 7, the receiver 706 is cylindrical in shape. In other embodiments the receiver 706 can be other shapes to fit to the motor shaft 130, for example, square, triangular, or any other shape. In the embodiment of FIG. 7, the receiver 706 includes a threaded hole 708 in the wall of the receiver 706. The threaded hole 708 can receive a set screw for securing the push lever 112 securely to the gear motor shaft 130. In another embodiment, the receiver 706 can include two through holes that are diametrically opposite each other so that a pin can be inserted through the two through holes in the receiver 706 and a corresponding through hole in the gear motor shaft 130 to secure the push lever 112 to the gear motor shaft 130.

Figure 8:
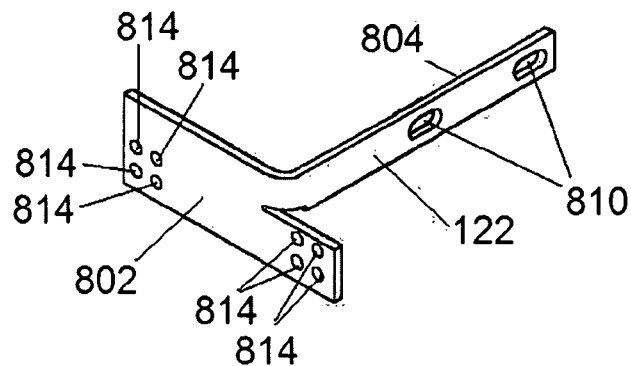
FIG. 8 is a perspective view of an embodiment of a lower bracket as illustrated in FIGS. 1-3.

FIG. 8 is a perspective view of an embodiment of a lower bracket 122 as illustrated in FIGS. 1-3. In the embodiment of FIG. 8, the lower bracket 122 includes a base 802 and an attachment arm 804 that extends approximately perpendicularly from the base 802. The lower bracket 122 operates to anchor the gear motor 108/109 and gear motor controller/driver 110 to the bottom side of the ball valve 106. In one embodiment, as shown in FIGS. 1-3, a U-bolt 126 wraps around the ball value 106, or supply line 104, and extends through two holes 810 in the attachment arm 804. The base 802 includes holes 814 for mounting the gear motor 108/109 and gear motor controller/driver 110. In the embodiment illustrated in FIG. 8 there are eight mounting holes 814. In other embodiments, there can be different numbers of mounting holes. In one embodiment, the mounting holes 814 and u-bolt holes 810 can be elongated to give additional flexibility for mounting adjustments. The attachment arm 804 of the lower bracket 122 also defines the home position for the push lever 112. When the push lever 112 is in the home position it allows freedom for movement of the ball valve handle 114 to close or open under manual operation.

Figure 9:
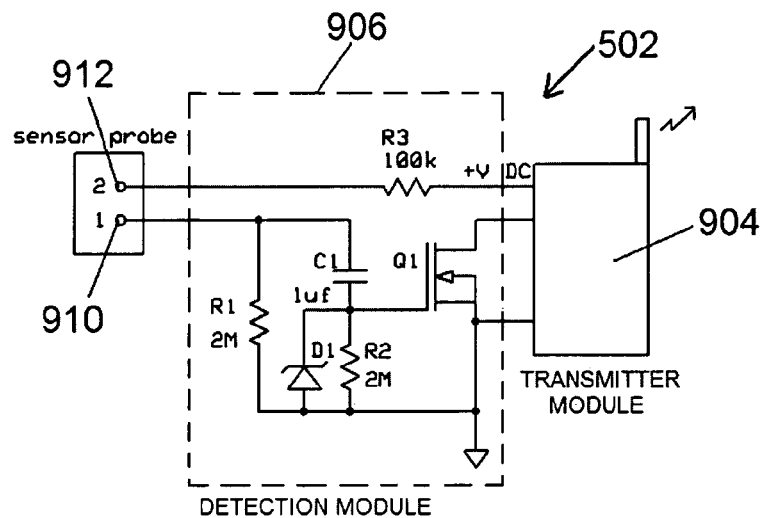
FIG. 9 is a schematic diagram of an embodiment of a leak detection sensor.

FIG. 9 is a schematic diagram of an embodiment of a leak detection sensor 502. As shown in FIG. 9, the leak detection sensor includes a transmitter module 904, a detection module 906, and sensor terminals 910 and 912. Optionally, the leak detection sensor 502 includes a battery, or the battery can be included in one of the modules in the leak detection sensor such as the transmitter module 904. In addition, the leak detection sensor can be power from an external source.

During operation the leak detection sensor 502 is located in a vicinity where there is potential for a leak. The leak detection sensor 502 senses the presence of a water leak by measuring a change in resistance between the sensor terminals 910 and 912. As described further below, in one embodiment, the sensor terminals 910 and 912 are connected to sensor probes through a connector, or hardwired.

If there is a water leak, the presence of the water will create a conductive path and thereby vary the resistance between the two sensor probe 910 and 912. In one embodiment, a current flows through a first resistor R3, the conductive path between the two probes 912 and 910, a capacitor C1, and a second resistor R2. The current flow through the second resistor R2 will develop a voltage at the gate of MOSFET transistor Q1 turning it on. After the capacitor C1 is charged by the current flow, the voltage across the second resistor R2 will decrease reducing the voltage at the gate of the MOSFET transistor Q1 turning it off.

The MOSFET transistor Q1 operates as a solid-state switch that closes briefly when there is a conductive path between the sensor terminals 910 and 912 cause by the presence of water. This brief turn-on aspect of the leak detection sensor increases the sensor battery life significantly because there is only a drain on the battery during the brief time that the MOSFET transistor Q1 is turned on. When the MOSFET transistor Q1 is turned on the transmitter module 904 will transmit a signal indicating the presence of water. In the detection module, a third resistor R1 provides a discharge path for capacitor C1. A diode D1 is provided to protect the MOSFET transistor Q1 gate from becoming a negative voltage during the discharge of C1, and also to protect gate from over voltage spikes.

The leak detection sensor 502 also includes the transmitter module 904. In one embodiment, the transmitter module 904 is an off-the-shelf transmitter, such as a wireless doorbell or wireless light switch transmitter or general purpose transmitter IC module, that operate at FCC permitted frequencies. In one embodiment, the transmitter module 904 includes a built in battery. In this embodiment, the power (+V DC) for the rest of the leak detection sensor 502 can be derived from the battery in the transmitter module 904.

In one embodiment, the MOSFET transistor Q1 output is connected to the transmitter module 904 such that when the MOSFET transistor Q1 turns on the transmitter will transmit. For example, the MOSFET transistor Q1 output can be connected across a pushbutton switch of a door-bell transmitter. When the MOSFET transistor Q1 is turned on by the presence of a water leak, the transmitter sends a signal to the receiver 512 located in, or near, the gear motor controller/driver 110.

Figure 10:
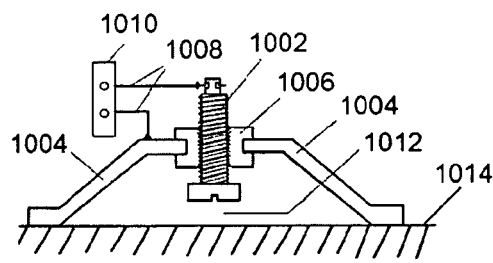
FIG. 10 is a block diagram of an embodiment of sensor probes that can be used with the leak detection sensor of FIGS. 5 and 9.

FIG. 10 is a block diagram of an embodiment of detection probes that can be used with the sensor terminals 910 and 912 or the leak detection sensor 502 of FIGS. 5 and 9. As shown in FIG. 10, the detection probe includes two conductive surfaces 1002 and 1004 separated by an insulating material 1006. In one embodiment, the two conductive surfaces 1002 and 1004 are connected by wires 1008 to a connector 1010. The connector 1010 can mate to a connector of the sensor terminals 910 and 912.

In one embodiment, a distance 1012 between the sensor probes 1002 and 1004 can be adjusted. For example, as illustrated in FIG. 10, one of the conductive surfaces 1004 can be configured to sit on a surface, such as a floor 1014. The second conductive surface 1002 can be a threaded device, similar to a bolt or screw, that can be adjusted so that there is a desired distance 1012 between the floor 1014 and the second conductive surface 1002. A slip ring can be used to connect the wire 1008 to the threaded conductor. The distance, or gap, 1012 between the floor 1014 and the second probe 1002 defines a level at which water will be detected. This technique can be used to prevent nuisance closure of the water mains valve 106, for example, when the floor 1014 is mopped for cleaning, or other events when a small amount of water may be present under normal circumstances rather than a leak.

Figure 11A:
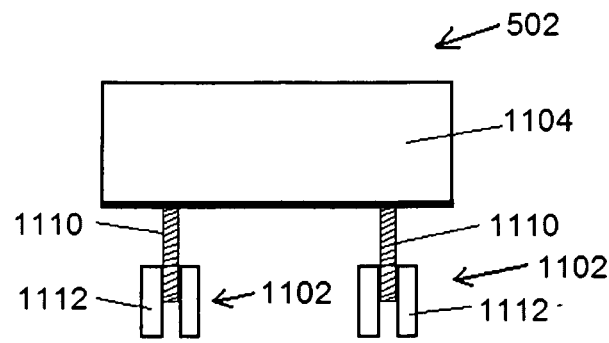
FIG. 11A is a side view of an embodiment of a leak detection sensor, such as leak detection sensors of FIGS. 5 and 9.
Figure 11B:
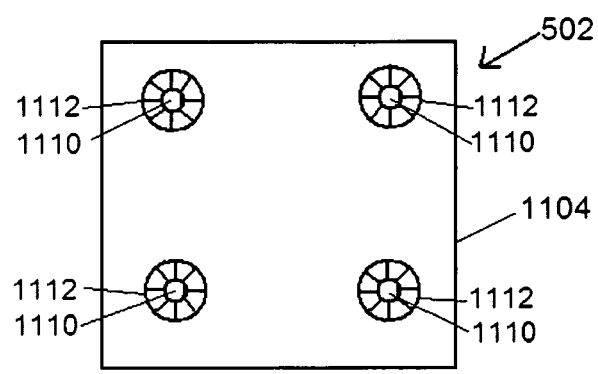
FIG. 11B is a bottom view of the leak detection sensor of FIG. 11A.

FIG. 11A is a side view of an embodiment of a leak detection sensor, such as leak detection sensors 502 of FIGS. 5 and 9. FIG. 11B is a bottom view of the leak detection sensor of FIG. 11A. In the embodiment of a leak detection sensor illustrated in FIGS. 11A and 11B, a printed wiring board with a water sensor circuit and transmitter circuit is mounted in a plastic enclosure 1104. For example, screws or other types of attachments can be used to mount the printed wiring board in the plastic enclosure 1104. In one embodiment, screws used to mount the printed wiring board in the plastic case 1104 can also serve as sensing probes 1102. In one embodiment, there are four sensing probes 1102 and each pair of probes 1102 correspond to one set of probes (electrical equivalent to terminals 910 and 912 of FIG. 9) that complete a circuit to sense water, thereby providing redundancy.

In the embodiment of FIGS. 11A and 11B, each sensing probe 1102 includes a mounting screw 1110 and an insulating spacer 1112. The mounting screws 1110 can serve as a platform for the sensor 502 to stand on surface where water needs to be detected. The insulating spacers 1112 can be threaded such that they can be used to change the sensing level of the water leak. In one embodiment, there are ribs on the bottom surface of the insulating spacers 1112 to allow water to flow under the spacer bottom to contact the mounting screws 1110 that make up the sensing probes 1102. Adjusting the height of the insulating cap 1112 holds the screw 1110 above a surface, such as a floor, can prevent nuisance closure of the water mains valve 106. For example, when a floor is mopped for cleaning, or other events when a small amount of water may be present under normal circumstances rather than a leak.

In another embodiment, the leak detection sensor 502 can be mounted on a wall. The insulated spacers 1112 can be removed from the sensing probes 1102 and a harness with pair of insulated conductors with lugs can be connected to the screws 1110. The other end of the conductors can be connected to a non-corrosive conductive material forming a probe separated by an insulator. This probe can be secured on the bottom of a wall at a desired height for water leak detection. One or more such harnesses can be attached to the screws 1110 to sense multiple locations in a given area. This technique provides flexibility of covering a local area near a wireless transmitter sensor using the less costly wires than using multiple complete leak detection sensors.

Figure 12:
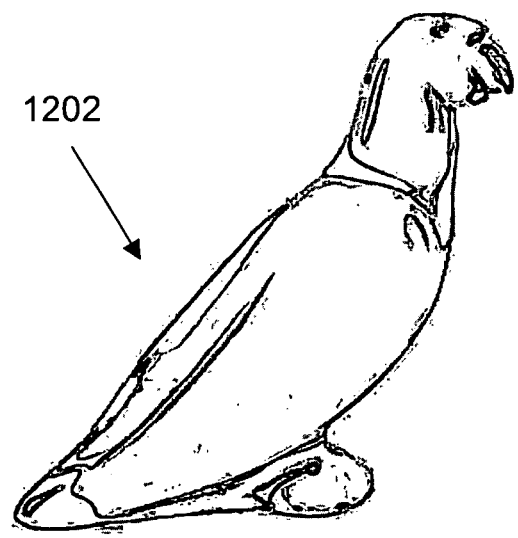
FIG. 12 is a diagram illustrating an embodiment of a leak detection sensor in a decorative structure.

FIG. 12 is a diagram illustrating an embodiment of a leak detection sensor in a decorative structure. FIG. 12 is an example of a leak detection sensor that can be installed in a decorative figure of a bird 1202. In one embodiment, the detection probes are located under the feet of the bird 1202 decorative figure. In another embodiment, a complete leak detection sensor is included within a decorative figure. Including detection probes, or leak detection sensors in decorative figures can improve the aesthetics of placing the leak detection sensors 502. While FIG. 12 shows the leak detection sensor 502 in a decorative statue, the sensors could also be concealed in other items such as furniture, fixtures, cabinets, and the like.

Figure 13:
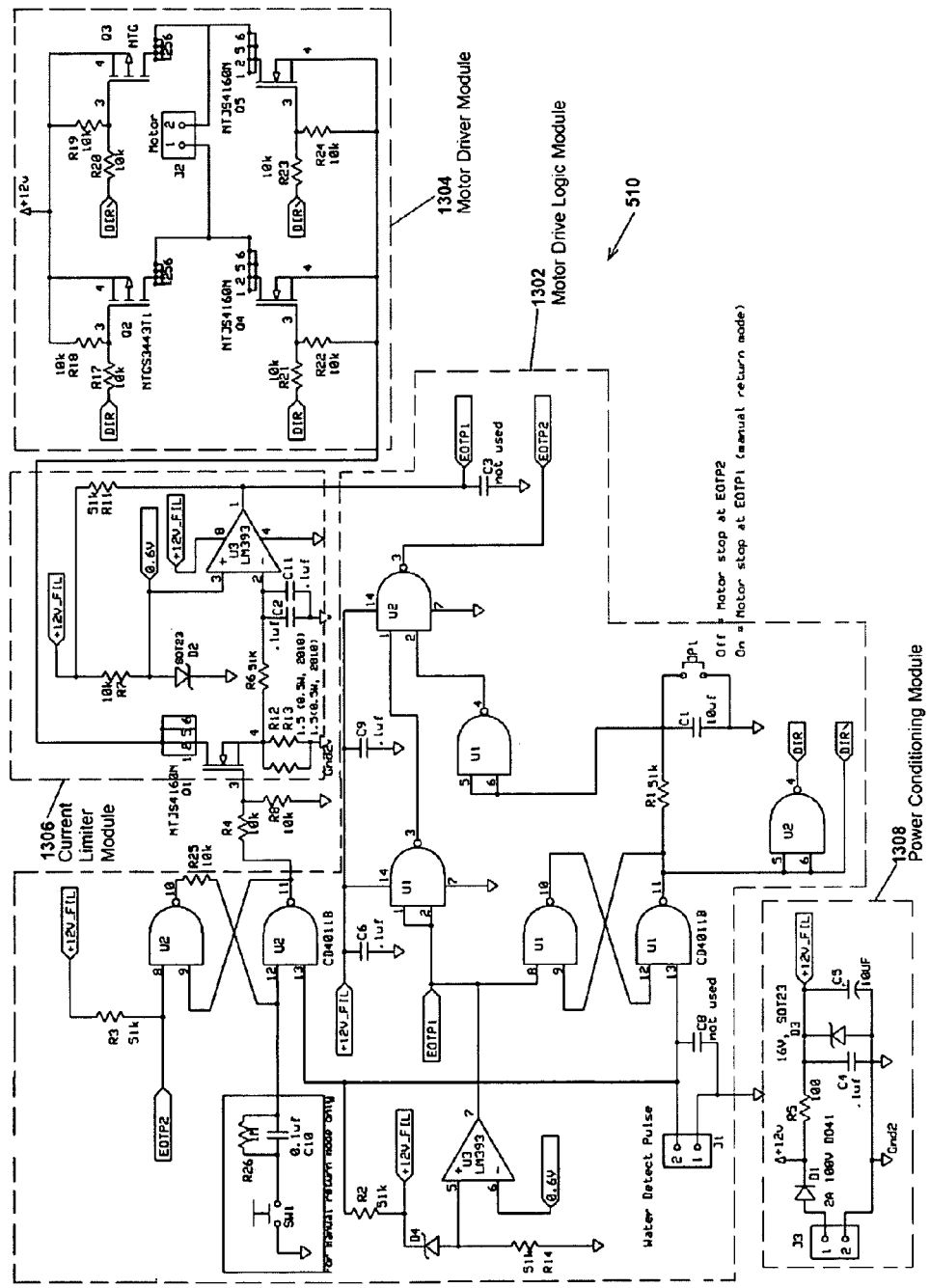
FIG. 13 is a schematic of an embodiment of a gear motor controller/driver.

FIG. 13 is a schematic of an embodiment of a gear motor controller/driver. As shown in FIG. 13, the gear motor controller/driver circuit 510 includes a motor drive logic module 1302, a motor drive module 1304, a current limiter module 1306, and a power conditioning module 1308. The power conditioning module 1308 conditions and provides power to the gear motor controller/driver 110.

In one embodiment, the motor drive logic module 1302 operates such that when activated by a water leak detection signal generates commands to the motor drive module 1304 to rotate the gear motor 108/109 shaft in a direction that closes the ball valve 106.

In one embodiment, the motor drive logic module 1302 does not receive input signals from conventional limit switches to detect the end of travel either at home position or at a closed position which, in the example of a ball valve, is approximately 90 degrees away from home position. Instead of using limit switches, the gear motor 108 current is monitored constantly by the current limiter module 1306. Alternatively, by coupling a feedback device 503 (FIG. 5) such as an optical encoder or potentiometer to the motor shaft, the valve can be controlled remotely and commanded to move to any desired position to accurately control the flow.

In an embodiment where the gear motor controller/driver is attached to a ball valve, there is typically a high motor start-up current due to high start-up torque of the ball valve in the first direction when the command is generated to apply power to the gear motor. A low pass filter (comprising R6, C2, C11) circuit can block, or prevent, this current from being detected. The filter can also block current spikes generated due to DC brush motor noise, gear train generated torque spikes, and other types of current spikes.

In another embodiment, during start-up, a current detect, or current limit, threshold is increased so that a larger inrush current is available to the gear motor 108 to provide a higher start-up torque. After start-up, the current limit threshold is decreased to a desired value for steady state operation. When the ball valve handle 114 reaches a stop, such as when the ball valve 106 is closed, a large current spike is detected and a gear motor reverse command is initiated.

Because the ball valve handle 114 is pushed only in one direction, to close the valve, the valve remains in the closed position when gear motor reverses and returns the push lever 112 to its home position. When the push lever 112 reaches the home position, a current spike in the gear motor current is detected and the gear motor is commanded to stop. Detecting current spikes at the both ends of travel of the gear motor eliminates the use of the expensive and less reliable limit switches for the motor control.

When desired, such as after the leak has been fixed, the ball valve handle 114 can be manually operated to the opened position. Alternatively, the ball valve handle 114 can be operated to any desired position, not necessarily to the fully opened position. After manual operation of the ball valve handle 114, the leak detection and prevention system is ready and armed for future leak detection operation. Because there are no complicated buttons to push, or procedures to follow, to arm the system again the system is simple yet elegant.

Figure 14:
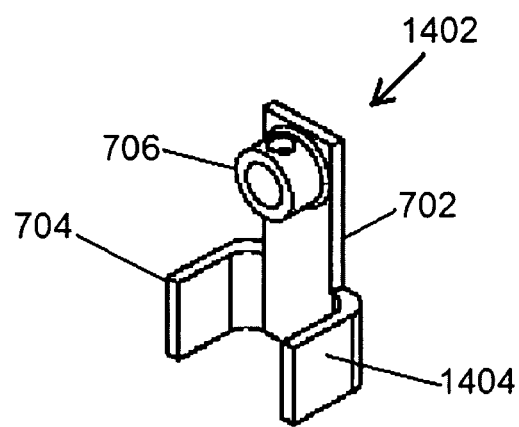
FIG. 14 is a perspective view of another embodiment of the push lever.

In another embodiment, the gear motor linkage assembly 102 can be adapted for bi-directional control of the ball valve 106. FIG. 14 is a perspective view of another embodiment of the push lever 1402. Similar to FIG. 7, the push lever 1402 includes a flat surface 702, a lip 704 projecting up from the side of the flat surface 702, and a receiver 706 sized to fit over the gear motor shaft 130. In the embodiment illustrated in FIG. 14, the push lever 1402 includes a second lip 1404 extending substantially perpendicular from the side of the flat surface 702 opposite lip 704. In this configuration the ball valve handle 114 can be positioned between the two lips 702 and 1404 such that the ball valve handle is captured and when the push lever 1402 rotates it captively engages the ball valve handle 114 and pushes the ball valve handle 114 to a closed or open position. The gear motor controller/driver 110 can be modified for bi-direction control. For example, referring to FIG. 13, a jumper JP1 and a push button switch SW1 can be added to re-configure the gear motor controller/driver for bi-directional operation or optionally via remote wireless control switch. In another embodiment, one or both of the lips 704 and 1404 can be configured such that they can be manually moved out of the path of the ball valve handle 114 so that the ball valve handle 114 can be manually operated.

Using a push lever 1402 that captively engages a ball valve handle, any mechanical ball valve can be converted into to an electrically actuated ball valve with the use of gear motor linkage assembly 102 and the push lever 1402. Also, by coupling a feedback device 503 (FIG. 5) such as an optical encoder or potentiometer to the motor shaft, the valve can be controlled remotely and commanded to move to any desired position to accurately control the flow.

Figure 15:
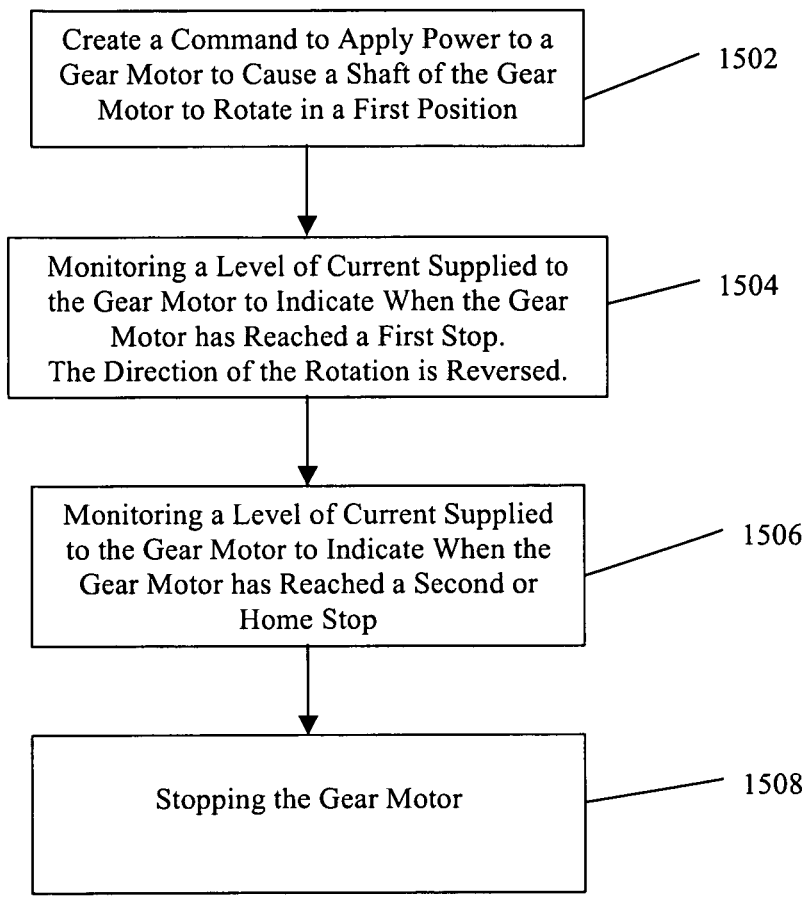
FIG. 15 is a flow diagram of an embodiment of controlling a gear motor. Flow begins in block 1502.

FIG. 15 is a flow diagram of an embodiment of controlling a gear motor. Flow begins in block 1502. In block 1502 a command is generated by a motor controller/driver module to apply power to the gear motor. The command causes a shaft of the gear motor to rotate in a first direction. Flow continues to block 1504. In block 1504 a level of current supplied to the motor is monitored. When the current level exceeds a first threshold level, indicating that a push lever attached to the gear motor shaft has reached a first stop, generating a command causing the shaft of the gear motor to rotate in a second direction, opposite the first direction. Flow continues to block 1506.

In block 1506 a level of current supplied to the motor is monitored. When the current level exceeds a second threshold level, indicating that the push lever attached to the gear motor shaft has reached a second stop, generating a command to stop the gear motor. Flow continues to block 1508 and the motor is stopped. In one embodiment, the first stop corresponds to a valve closed position and the second stop corresponds to a home position. In addition, the first and second threshold levels can be the same value.

Figure 16:
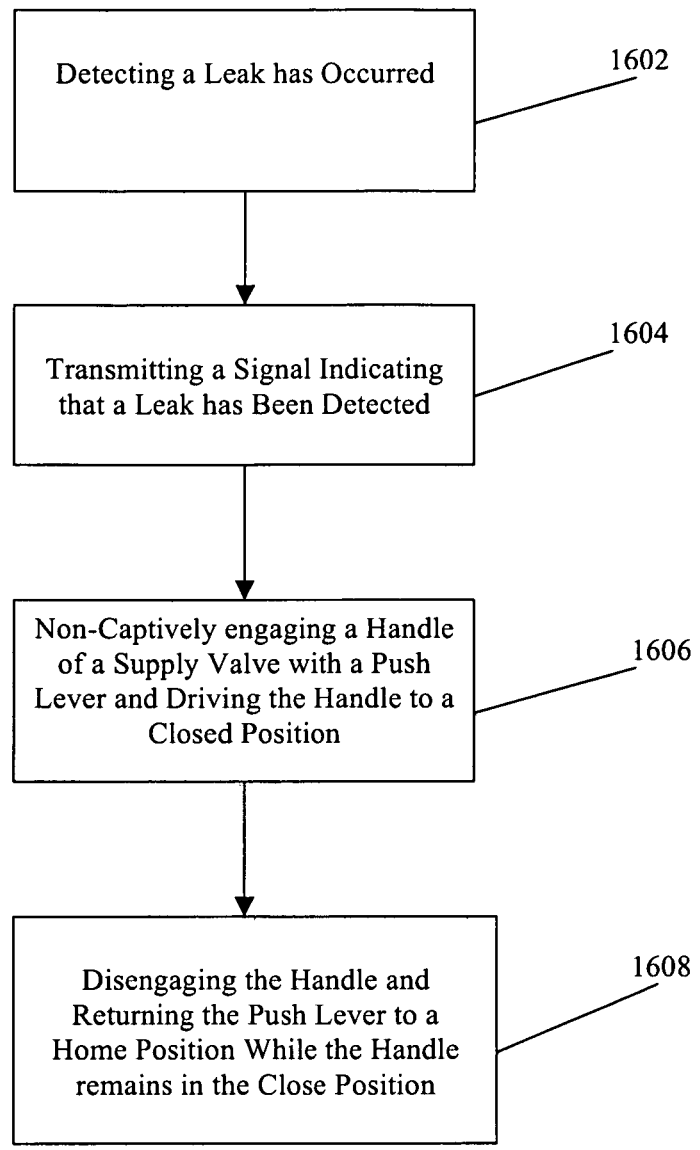
FIG. 16 is a flow diagram of an embodiment of detecting and preventing a leak.

FIG. 16 is a flow diagram of an embodiment of detecting and preventing a leak. Flow begins in block 1602 where it is detected that a leak has occurred. Flow then continues to block 1604 where a signal indicating that the leak has been detected is transmitted. Flow continues to block 1606 and a handle of a supply valve is non-captively engaged with a push lever that drives the handle to a closed position. Flow continues to block 1608 and the handle is disengaged and returns the push lever to a home position while the handle remains in the closed position.

Figure 17:
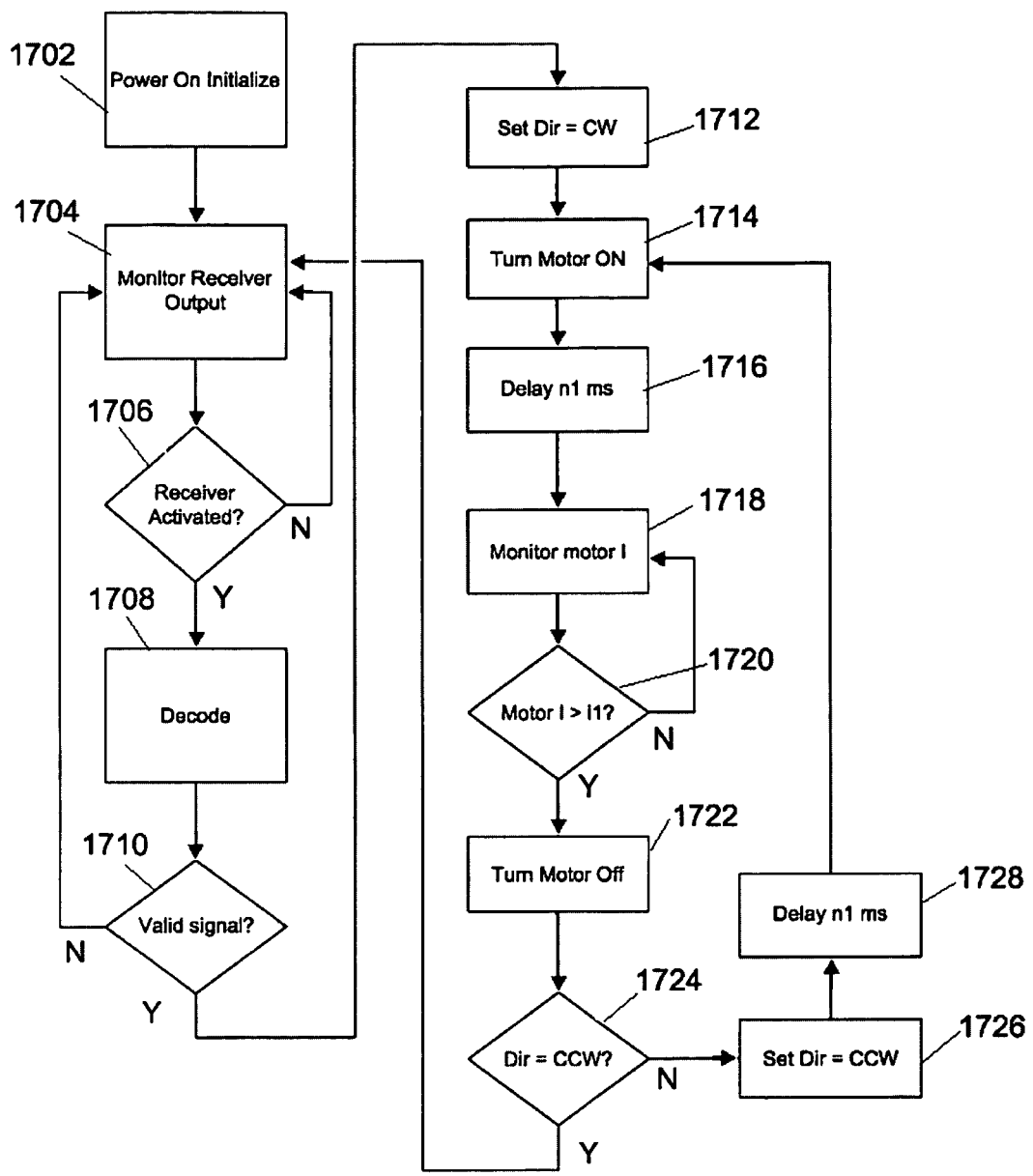
FIG. 17 is a flow diagram of an embodiment of controlling a motor in a gear motor linkage assembly, such as the gear motor linkage assembly 102 illustrated in FIGS. 1-5.

FIG. 17 is a flow diagram of an embodiment of controlling a motor in a gear motor linkage assembly, such as the gear motor linkage assembly 102 illustrated in FIGS. 1-5. Flow begins in block 1702 where a motor power on initialization procedure is performed. Flow continues to block 1704 and an output of a receiver in the motor controller/driver is monitored. Flow continues to block 1706 where it is determined if the receiver has been activated. For example, the receiver can be activated by receiving a signal from a leak detection sensor that has sensed a leak. If it is determined that the receiver has not been activated flow continues to block 1704 and the receiver output is monitored.

If, in block 1706 is determined that the receiver has been activated, flow continues to block 1708. In block 1708 the receiver output is decoded. Flow continues to block 1710 where it is determined if the signal is valid. If it is determined that the signal is not valid, flow continues to block 1704 and the receiver output is monitored. If in block 1710 it is determined that the received signal is valid flow continues to block 1712.

In block 1712 a direction of rotation is set to a desired value, such as for clockwise rotation. Flow continues to block 1714 and the motor is turned on. Flow continues to block 1716 and a current monitoring circuit is delayed. For example, a delay can be used to permit a high motor start-up current due to high start-up torque. In one embodiment, a low pass filter circuit can be used to implement the delay. Flow then continues to block 1718 and the amount of current that drives the motor is monitored.

In block 1720 it is determined if the current to the motor exceeds a threshold. In one embodiment, when the current to the motor is below the threshold, the motor may be engaging a valve handle and turning a valve off. When the valve handle reaches the closed position it will stop turning resulting in an increase in motor current. Likewise, as described below, when the motor returns to its home position, it will engage a stop that will also result in increased motor current. If in block 1720 it is determined that the current level does not exceed the threshold flow continues to block 1718 and the motor current is continued to be monitored. If in block 1720 it is determined that the current to the motor exceeds the threshold flow continues to block 1722. In block 1722 the motor is turned off.

Flow continues to block 1724 and the direction of rotation of the motor is determined. If it is determined that the direction of rotation is clockwise, indicating that the motor has been closing a valve, flow continues to block 1726. In block 1726 the direction of rotation is changed to counterclockwise to return the motor to its home position. Flow continues to block 1728 where there is a delay. Flow then continues to block 1714, and as described above, the motor returns to its home position. Returning to block 1724, if it is determined that the direction of rotation is counterclockwise, indicating that the motor has returned to its home position, flow continues to block 1704 and the motor is ready to receive another signal indicating a leak.

The leak detection and prevention system described herein is a simple system that can detect a leak at various locations within a facility simultaneously and automatically shut-off the main supply valve when a leak is detected. The system described provides many advantages. For example, the gear motor linkage assembly 102 can be installed on an existing supply main ball valve without any modifications of the ball valve. There are not required any changes to existing plumbing. Also the system is transparent to the user, i.e. after the device is installed, the user can manually control the main valve without any interference from the installed gear motor linkage assembly 102. Also, the gear motor controller/driver can operate to close the ball valve without the use of limit switches or end of travel sensors. In addition, the gear motor linkage assembly 102 can be mounted directly on a valve housing which is mechanically rigid and stronger than plumbing pipes. This eliminates problems associated with the loads created by the gear motor linkage assembly 102 weakening the plumbing.

Additional advantageous include that the leak detection sensors are simple and can use, for example, wireless door-bell transmitters, which are off-the-self mass produced devices, to transmit the signal detected by leak detection sensor. Another advantage is that the battery life of a sensor is extended significantly by the leak detection sensor circuit which only powers the transmitter for a brief duration when the leak is detected. Also, the leak detection sensor can be packaged in a decorative figurine to function also as a show piece. The leak detection sensor can have a built-in adjustment for a flood level trigger.

Following is a description of an example of installing a leak detection and prevention system including, for example, the gear motor linkage assembly 102 illustrated in FIGS. 1-3, and 4A-4C and leak detection sensors illustrated in FIGS. 9-12:

1. Mount the assembled gear motor linkage assembly 102 on the main ball valve 106 and secure it in place using two U-bolts 124 and 126.
2. Connect a power source or adapter to the gear motor controller/driver 110.
3. Install a battery inside the leak detection sensors 502 and position the sensors at various locations prone to leak.
4. Test the system by wetting probes on the leak detection sensor, such as by putting a wet towel under the sensor 502. This will trigger the gear motor controller/driver to close the main ball valve 106.
5. Open the ball valve handle 114 manually and the system is ready and armed to detect future leaks.

While the leak detection and prevention system has been described in relation to detecting water leaks and shutting of a main water supply line, this example was just to illustrate various aspects of the invention. It should be understood that various alternatives to the embodiments of the invention described herein may be employed. For example, while the above description was of controlling a ball valve, a rotary or gate valve can also be controlled by modifying the push lever 112 such that it engages with the rotary wheel of the gate valve. Also, while the main supply line has been described as a water line, other types of supply line valves can be controlled, such as gas line valves or any other liquid valves with appropriate sensors. For example, a gas leak detection sensor, or a vibration sensor for earthquake detection, can be used in the control of a gas supply line valve. In addition, the motor control circuit developed for this application that eliminates limit switches or end of travel sensors can also be used for other applications.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A leak detection and prevention system for coupling to a valve that is manually operable by an attached handle, the system comprising:
   a gear motor linkage assembly including a motor and gear box;
   a push lever initially in a home position and coupled to a shaft of the motor;
   a motor controller/driver module configured to
      receive a signal indicating that a leak has been detected, upon receiving such signal to control the motor to drive the push lever so that the push lever non-captively engages the handle of the valve and pushes the handle to a closed position, and
      thereafter to control the motor to return the push lever, disengaging it from the valve handle, to the home position; and
   at least one leak detection sensor configured to activate a transmitter that transmits the signal indicating the presence of a leak upon encountering appropriate fluid.

2. The system of claim 1, wherein the leak detection transmitter is a wireless transmitter.

3. The system of claim 1, wherein the valve is a ball valve.

4. The system of claim 1, wherein the valve is a gate valve.

5. The system of claim 1, wherein the valve can be manually operated when the push lever is in the home position.

6. The system of claim 1, wherein the motor controller/driver module is further configured to detect the handle of the valve is in a closed position, including configuration to detect an increase in current to the gear motor.

7. The system of claim 1, wherein the motor controller/driver module is further configured to detect the push lever is in the home position, including configuration to detect an increase in current to the gear motor.

8. The system of claim 1, further comprising a feedback device configured to indicate a position of the handle of the valve.

9. The leak detection and prevention system of claim 1 wherein at least one leak detection sensor comprises a detection circuit configured to measure a resistance between at least two detection probes and to actuate a switch to activate the transmitter when the resistance between the at least two detection probes is below a predetermined value.

10. The leak detection and prevention system of claim 1 wherein at least one leak detection sensor is configured to impose a current drain on a power source only when a leak is detected.

11. A motor controller/driver module for interfacing with a valve that is manually operable by an attached handle, the module comprising:
   a motor drive logic module configured to respond to a signal indicating presence of a leak by generating commands to actuate a gear motor to drive a push lever coupled to a shaft of the gear motor from an initial home position to non-captively engage and push the attached handle of the valve in a closing direction, to respond to a first current analysis signal by generating commands to reverse the gear motor direction to drive the push lever toward the home position, and to respond to a second current analysis signal by generating commands to stop the gear motor;
   a motor driver module configured to receive the commands and responsively control power to the gear motor to cause the shaft of the gear motor to rotate in suitable directions; and
   a current analysis module configured to monitor a level of current supplied to the motor, to provide the first current analysis signal for the motor drive logic module upon detecting a first current spike indicating that the push lever coupled to the gear motor shaft has reached a first stop, and to provide the second current analysis signal for the motor drive logic module upon detecting a second current spike indicating that the push lever coupled to the gear motor shaft has reached a second stop in home position.

12. The motor controller/driver module of claim 11, wherein the signal indicating the presence of a leak is received from a leak detection sensor.

13. The motor controller/driver of claim 11, wherein the push lever non-captively engages a handle of a ball valve.

14. The motor controller/driver of claim 11, wherein the push lever non-captively engages a handle of a gate valve.

15. A valve comprising:
   a ball valve with a manually operable handle;
   a gear motor;
   a motor controller/driver module that controls operation of the motor,
   a push lever coupled to a shaft of the motor such that when the motor is suitably driven the push lever non-captively engages and drives the handle of the valve;
   a feedback device capable of communicating with the motor controller/driver module to provide an indication of a position of the valve handle enabling the motor controller/driver module to move the valve handle to a desired position.

16. The valve of claim 15, wherein the feedback device is an optical encoder.

17. The valve of claim 15, wherein the feedback device is a potentiometer.

\* \* \* \* \*